M. P. McLAUGHLIN.
HOSE CLAMP.
APPLICATION FILED MAY 5, 1910.

973,532.

Patented Oct. 25, 1910.

Witnesses:
F. R. Roulstone
H. L. Allen

Inventor:
M. P. McLaughlin
by Knight Brown Quinby May
Attys.

UNITED STATES PATENT OFFICE.

MILTON P. McLAUGHLIN, OF WAKEFIELD, MASSACHUSETTS, ASSIGNOR OF FORTY-FIVE ONE-HUNDREDTHS TO H. C. McCARTY, OF WILLIAMSPORT, PENNSYLVANIA.

HOSE-CLAMP.

973,532.

Specification of Letters Patent.

Patented Oct. 25, 1910.

Application filed May 5, 1910. Serial No. 559,529.

*To all whom it may concern:*

Be it known that I, MILTON P. McLAUGHLIN, of Wakefield, in the county of Middlesex and State of Massachusetts, have invented certain new and useful Improvements in Hose-Clamps, of which the following is a specification.

This invention relates to a two-part hose clamp for securing a flexible fluid-conducting hose to a coupling member inserted in the end thereof, the clamp surrounding the end of the hose and binding it tightly against the portion of the coupling member within the hose.

The invention is an improvement on a hose clamp of the type shown in Letters Patent of the United States, 751,329, granted to me February 9, 1904, said patent covering a hose-clamp comprising segments having at one end interlocking members one of which is a hook whose recess faces inwardly, the other being a projection adapted to enter said recess by an outward movement, said members having permanent complemental devices locking against relative axial movement by the fitting together of said members, and means for locking together the opposite ends of said segments.

The invention has reference to the means for locking together the outer overlapping ends of the segments and has for its object to provide improved means for this purpose adapted to securely connect said ends with freedom of liability of accidental disconnection of the same.

The invention consists in the improvements which I will now proceed to describe and claim.

Figure 1:
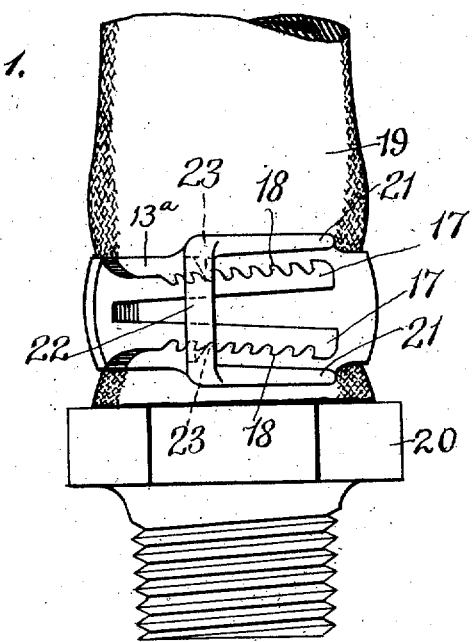
Figure 2:
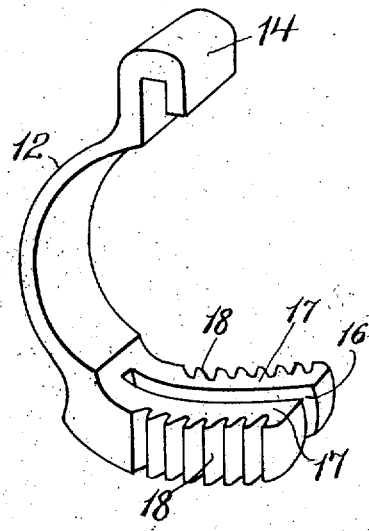
Figure 3:
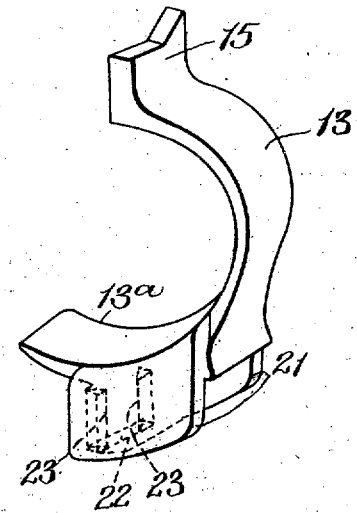

Of the accompanying drawings which form a part of this specification,—Figure 1 represents an edge view of my improved coupling and a portion of a hose secured thereby to a coupling member. Figs. 2 and 3 represent perspective views of the members of the clamp shown in Fig. 1, said members being disconnected.

Similar reference characters indicate the same or similar parts in all the figures.

In the drawings, 12 and 13 represent the segments of a hose clamp, the segment 12 being provided at one end with a hook 14 whose recess faces inwardly. The corresponding end of the segment 13 is formed with a radial projection 15 adapted to enter said recess, the said hook and projection being formed on the respective segments and constituting interlocking members which may be connected and separated by a relative radial and pivotal movement of the segments, the said members acting as a hinge. The members 14 and 15 are also provided respectively with a tooth and with a notch occupied thereby, whereby the axial displacement of the sections at this end is prevented when the members 14 and 15 are interlocked.

The construction thus far described is practically the same as that set forth in the above-mentioned Letters Patent.

In carrying out the present invention I provide the segment 12 with an extension containing a longitudinal slot 16 which divides the extension into two flexible arms 17 which are provided with ratchet teeth 18 on their outer sides. The segments are preferably malleable iron castings, the arms 17 being flexible so that they may be forced apart, as indicated in Fig. 1, to interlock the ratchet teeth 18 with complemental teeth hereinafter described, formed on the segment 13. The end portion 13$^a$ of the segment 13, opposite the end which has the projection 15, is preferably tapered and formed to bear upon the inner side of the slotted extension of the segment 12, said inner side being recessed to accommodate the reduced end of the segment 13, so that when the segments are applied to a hose 19 which contains a part of a coupling member 20, the inner surfaces of the segments will form practically a complete circle surrounding and bearing closely on the external surface of the hose.

On the end portion 13$^a$ of the segment 13 are formed two outwardly projecting wings or flanges 21 which are connected by a bridge or crossbar 22. These flanges are separated by a space of sufficient width to permit the entrance of the arms 17 between them, said arms being adapted to pass between the end portion 13$^a$ and the crossbar 22. On the inner sides of the flanges 21 are formed inwardly projecting teeth or detents 23 adapted to simultaneously engage two of the ratchet teeth 18, as shown by Fig. 1.

In applying the clamp to a hose the portions 14 and 15 of the segments are first interlocked, the form of said portions being such that they establish a pivotal connection between the segments. The segments are then pressed inwardly against the surface of the hose, the arms 17 being inserted between the flanges 21 until they bear with the desired pressure upon the hose. The arms 17 are then forced apart by a suitable tool inserted between their outer ends, until two of their teeth are brought into engagement with the teeth 23, thus interlocking the two segments and maintaining the pressure on the hose. The arms 17 are inert or non-resilient so that they retain the positions imparted to them as above described.

It will be seen that the segments are securely interlocked by the simple operation of increasing the width of the slotted extension of the segment 12, the interlocking being at two points.

The length of the flanges 21 is preferably such that they protect the serrated edges of the arms 17 against contact with external objects which would be liable to displace the arms inwardly and disengage them from the teeth 23. The flanges 21 therefore constitute guards whereby accidental separation of the segments is prevented.

I claim:

1. A hose clamp comprising segments having a pivotal interlocked engagement at one end, one segment having an extension at its opposite end provided with depending protecting flanges and the opposite end of the other segment having a bifurcated extension adapted to lie between said flanges and be spread into engagement therewith.

2. A hose clamp comprising segments having a pivotal interlocked engagement at one end, one of said segments having a bifurcated extension at its opposite end, the faces of said bifurcations being serrated, and the other segment being provided with an extension having depending protecting flanges to receive said bifurcated extension between them.

3. A hose clamp comprising segments having a pivotal interlocked engagement at one end, one of said segments having a bifurcated extension at its opposite end, the faces of said bifurcations being serrated and the other segment being provided with an extension having depending protecting flanges to receive said bifurcated extension between them, said flanges having projections on their inner faces to engage said serrated faces.

4. A hose clamp comprising segments having a pivotal interlocked engagement at one end, one of said segments having a bifurcated extension at its opposite end, the faces of said bifurcations being serrated and the other segment being provided with an extension having depending protecting flanges to receive said bifurcated extension between them, said flanges having projections on their inner faces to engage said serrated faces, and a cross bar connecting said flanges.

In testimony whereof I have affixed my signature, in presence of two witnesses.

MILTON P. McLAUGHLIN.

Witnesses:
F. R. RONLSTONE,
F. W. PEZZETTI.